(12) United States Patent
Ramjee et al.

(10) Patent No.: US 9,083,708 B2
(45) Date of Patent: Jul. 14, 2015

(54) ASYMMETRIC END HOST REDUNDANCY ELIMINATION FOR NETWORKS

(75) Inventors: Ramachandran Ramjee, Bangalore (IN); Bhavish Aggarwal, Bangalore (IN); Pushkar Chitnis, Bangalore (IN); George Varghese, San Diego, CA (US); Ashok Anand, Madison, WI (US); Chitra Muthukrishnan, Madison, WI (US); Athula Balachandran, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 631 days.

(21) Appl. No.: 12/781,782

(22) Filed: May 17, 2010

(65) Prior Publication Data

US 2011/0282932 A1    Nov. 17, 2011

(51) Int. Cl.
*G06F 15/16* (2006.01)
*H04L 29/08* (2006.01)

(52) U.S. Cl.
CPC .................................. *H04L 67/1002* (2013.01)

(58) Field of Classification Search
CPC .................................................... H04L 67/1002
USPC ......... 709/203, 218, 219, 221, 247, 248, 213, 709/220, 223, 224, 230; 370/230, 477, 370/229–230.1, 235.1, 236, 35, 471
See application file for complete search history.

(56) References Cited

U.S. PATENT DOCUMENTS

| 5,703,581 A | 12/1997 | Matias |
| 5,883,901 A * | 3/1999 | Chiu et al. .................. 370/508 |

(Continued)

FOREIGN PATENT DOCUMENTS

| JP | 2002-268937 | 9/2002 |
| WO | 9967925 A1 | 12/1999 |

OTHER PUBLICATIONS

Aggarwal et al.; EndRE: An End-System Redundancy Elimination Service for Enterprises; Proceedings of NSDI '10 UNIX Symposium on Networked Systems Designs and Implementation that took place on Apr. 28-30, 2010.*

(Continued)

*Primary Examiner* — Jimmy H Tran
(74) *Attorney, Agent, or Firm* — Sandy Swain; Judy Yee; Micky Minhas

(57) ABSTRACT

An end host redundancy elimination system and method to provide redundancy elimination as an end system service. Embodiments of the system and method use optimization techniques that reduce server central processing unit (CPU) load and memory footprint as compared to existing approaches. For server storage, embodiments of the system and method use a suite of highly-optimized data structures for managing metadata and cached payloads. An optimized asymmetric max-match technique exploits the inherent structure in data maintained at the server and client and ensures that client processing load is negligible. A load-adaptive fingerprinting technique is used that is much faster than current fingerprinting techniques while still delivering similar compression. Load-adaptive means that embodiments of the fingerprinting technique can adapt CPU usage depending on server load. Embodiments of the system and method operate above the transmission control protocol (TCP) layer, thereby reducing the number of roundtrips needed for data transfer.

20 Claims, 7 Drawing Sheets

(56) References Cited

U.S. PATENT DOCUMENTS

| | | | |
|---|---|---|---|
| 5,978,386 | A | 11/1999 | Hamalainen et al. |
| 6,041,142 | A | 3/2000 | Rao |
| 6,438,678 | B1 | 8/2002 | Cashman et al. |
| 6,456,594 | B1 | 9/2002 | Kaplan et al. |
| 6,631,420 | B1 | 10/2003 | Li et al. |
| 6,865,577 | B1* | 3/2005 | Sereda ................. 707/699 |
| 6,952,664 | B1* | 10/2005 | Lahiri et al. ................. 703/14 |
| 7,188,214 | B1 | 3/2007 | Kasriel |
| 7,330,904 | B1* | 2/2008 | Kleiman ................. 709/238 |
| 7,581,028 | B2 | 8/2009 | Han |
| 7,716,314 | B1 | 5/2010 | Chen et al. |
| 7,752,391 | B2* | 7/2010 | Cornwell et al. ............. 711/118 |
| 7,773,634 | B1 | 8/2010 | Machiraju |
| 7,843,823 | B2* | 11/2010 | Lev-Ran et al. ............ 370/230.1 |
| 7,975,071 | B2* | 7/2011 | Ramjee et al. ................. 709/247 |
| 8,040,744 | B2* | 10/2011 | Gorobets et al. ............. 365/200 |
| 8,135,683 | B2* | 3/2012 | Douglis et al. ................. 707/693 |
| 8,145,768 | B1* | 3/2012 | Hawthorne ................. 709/228 |
| 8,432,911 | B2* | 4/2013 | Guo et al. ................. 370/392 |
| 8,548,012 | B2* | 10/2013 | Guo et al. ................. 370/912 |
| 2003/0030575 | A1* | 2/2003 | Frachtenberg et al. ......... 341/51 |
| 2003/0061405 | A1 | 3/2003 | Fisher et al. |
| 2003/0063564 | A1* | 4/2003 | Ha et al. ................. 370/230 |
| 2003/0099237 | A1 | 5/2003 | Mitra et al. |
| 2003/0152084 | A1* | 8/2003 | Lee et al. ................. 370/395.21 |
| 2004/0146053 | A1 | 7/2004 | Nabhan et al. |
| 2004/0148597 | A1 | 7/2004 | Lilley |
| 2004/0165527 | A1 | 8/2004 | Gu et al. |
| 2005/0055419 | A1* | 3/2005 | Oh ................. 709/213 |
| 2005/0138530 | A1* | 6/2005 | Huang et al. ................. 714/774 |
| 2005/0188081 | A1 | 8/2005 | Gibson et al. |
| 2006/0023721 | A1* | 2/2006 | Miyake et al. ............. 370/395.2 |
| 2006/0047855 | A1 | 3/2006 | Gurevich et al. |
| 2006/0184652 | A1 | 8/2006 | Teodosiu et al. |
| 2007/0058610 | A1 | 3/2007 | Brandstatter |
| 2007/0121653 | A1 | 5/2007 | Reckamp et al. |
| 2007/0174551 | A1* | 7/2007 | Cornwell et al. ............. 711/118 |
| 2008/0025298 | A1* | 1/2008 | Lev-Ran et al. ............. 370/389 |
| 2008/0279099 | A1* | 11/2008 | Thomasson ................. 370/230.1 |
| 2009/0187673 | A1* | 7/2009 | Ramjee et al. ................. 709/247 |
| 2009/0193310 | A1* | 7/2009 | Hashimoto ................. 714/749 |
| 2010/0103953 | A1* | 4/2010 | Matias et al. ................. 370/477 |
| 2010/0172179 | A1* | 7/2010 | Gorobets et al. ......... 365/185.09 |
| 2010/0254377 | A1* | 10/2010 | Akella et al. ................. 370/389 |
| 2010/0254378 | A1* | 10/2010 | Akella et al. ................. 370/389 |
| 2010/0329256 | A1* | 12/2010 | Akella et al. ................. 370/392 |
| 2011/0176543 | A1* | 7/2011 | Guo et al. ................. 370/389 |
| 2011/0176556 | A1* | 7/2011 | Guo et al. ................. 370/474 |
| 2013/0042087 | A1* | 2/2013 | Shah et al. ................. 711/173 |

OTHER PUBLICATIONS

A. Anand et al.; Packet Caches on Routers: The Implications of Universal Redundant Traffic Elimination. In ACM SIGCOMM, Seattle, WA, Aug. 2008.*

A. Anand et al.; Redundant in Network Traffic: Findings and Implications. In ACM SIGMETRICS, Seattle, WA, Jun. 2009.*

N. T. Spring and D. Wetherall. A protocol-independent technique for eliminating redundant network traffic. In SIGCOMM, pp. 87-95, 2000.*

PCT Patent Application PCT/US2008/088096; Search Report and Written Opinion dated Jun. 25, 2009; 9 pages.

Bromberg, P.; "Product Review: XCompress"; http://www.eggheadcafe.com/Articles/20020907.asp; Sep. 7, 2002.

"Categorizing Layered Service Providers and Applications"; retrieved at http://msdn.microsoft.com/en-us/library/bb513664(VS.85,printer).aspx; Nov. 12, 2009; 3 pages.

"Cisco Wide Area Application Services SSL Acceleration: Accelerate Applications over the WAN"; retrieved at http://www.cisco.com/en/US/prod/collateral/ps6712/ps6718/solution_overview_c22-532534.pdf; 2009; 9 pages.

Gadda, R.; "WAN optimization continues growth"; Computerworld; Oct. 13, 2005; 4 pages.

Jenkins, B.; "lookup3.c"; retrieved at http://burtleburtle.net/bob/c/lookup3.c; May 2006; 15 pages.

"Juniper Networks to Acquire Peribit Networks and Redline Networks"; retrieved at http://www.juniper.net/us/en/company/press-center/press-releases/2005/pr-050426a.html; Apr. 26, 2005; 2 pages.

Muthitacharoen et al.; "A low-bandwidth Network File System"; Oct. 2001.

Park, et al.; "Supporting Practical Content-Addressable Caching with CZIP Compression"; Proceedings of the USENIX Annual Technical Conference; 2007; Article 14; pp. 1-14.

"Power Monitor"; Monsoon Solutions Inc.; retrieved at http://www.msoon.com/LabEquipment/PowerMonitor/; accessed Dec. 24, 2009; 1 page.

Rabin, M.; "Fingerprinting by Random Polynomials"; 1981; 14 pages.

Rhea, S. et al.; "Value-Based Web Caching"; Proceedings of the 12$^{th}$ International World Wide Web Conference; May 2003; 10 pages.

"Riverbed Networks: WAN Optimization"; retrieved at http://www.riverbed.com/solutions/wan_optimization; accessed Dec. 18, 2012; 13 pages.

Saltzer, J.H. et al.; "End-to-End Arguments in System Design"; ACM Trans. Comput. Syst. 2; No. 4; Nov. 1984; pp. 277-288.

Schleimer, S. et al.; "Winnowing: Local Algorithms for Document Fingerprinting"; Proceedings of the 2003 ACM SIGMOD International Conference on Management of Data; 2003; pp. 76-85.

Teodosiu et al.; "Optimizing File Replication Over Limited-Bandwidth Networks using Remote Differential Compression"; Nov. 2006.

Tolia, N. et al.; "Opportunistic Use of Content Addressable Storage for Distributed File Systems"; USENIX Annual Technical Conference; 2003; San Antonio, TX; 14 pages.

"Windows Filtering Platform Architecture Overview"; retrieved at http://msdn.microsoft.com/en-us/library/aa366509(VS.85.printer).aspx; accessed Dec. 24, 2009; 2 pages.

Anand, A., A. Gupta, A. Akella, S. Seshan, S. Shenker, Packet caches on routers: The implications of universal redundant traffic elimination, Proc. of the ACM SIGCOMM 2008 Conf. on Applications, Technologies, Architectures, and Protocols for Comp. Communications, SIGCOMM 2008, pp. 219-230, Aug. 17-22, 2008, Seattle, WA, USA.

Anand, A., C. Muthukrishnan, A. Akella, R. Ramjee, Redundancy in network traffic: Findings and implications, Proc. of the Eleventh Int'l Joint Conf. on Measurement and Modeling of Computer Systems, SIGMETRICS/Performance 2009, Jun. 15-19, 2009, pp. 37-48, Seattle, WA, USA.

Anand, A., V. Sekar, A. Akella, SmartRE: An architecture for coordinated network-wide redundancy elimination, Proc. of the ACM SIGCOMM 2009 Conf. on Applications, Technologies, Architectures, and Protocols for Comp. Communications, SIGCOMM 2009, Aug. 17-21, 2009, pp. 87-98, Barcelona, Spain.

Annapureddy, S., M. J. Freedman, D. Mazières, Shark: Scaling file servers via cooperative caching, Proc. of the 2nd Symposium on Networked Sys's Design and Implementation, NSDI 2005, May 2-4, 2007, pp. 14, Boston, Massachusetts, USA.

Arlitt, M. F., C. L. Williamson, An analysis of TCP reset behaviour on the internet, Comp. Comm. Review, Jan. 2004, pp. 37-44, vol. 35, No. 1.

Barr, K C., K. Asanovic, Energy-aware lossless data compression, ACM Trans. Comput. Syst., Aug. 2006, pp. 250-291, vol. 24, No. 3.

Cooper, K. D., L. Xu, Memory redundancy elimination to improve application energy efficiency, 16th Int'l Workshop on Languages and Compilers for Parallel Computing, LCPC 2003, Oct. 2-4, 2003, pp. 288-305, College Station, TX, USA.

Douglis, F., A. Lyengar, Application-specific delta-encoding via resemblance detection, Proc. of the General Track: 2003 USENIX Annual Technical Conf., USENIX 2003, Jun. 9-14, 2003, pp. 113-126, San Antonio, Texas, USA.

Eriksson, J., S. Agarwal, P. Bahl, J. Padhye, Feasibility study of mesh networks for all-wireless offices, Proc. of the 4th Int'l Conf. on Mobile Sys's, Applications, and Services, MobiSys 2006, Jun. 19-22, 2006, pp. 69-82, Uppsala, Sweden.

Gutwin, C., C. Fedak, M. Watson, J. Dyck, T. Bell, Improving network efficiency in real-time groupware with general message com-

(56) References Cited

OTHER PUBLICATIONS pression, Proc. of the 2006 ACM Conf. on Comp. Supported Cooperative Work, CSCW 2006, Nov. 4-8, 2006, pp. 119-128, Banff, Alberta, Canada.
Mogul, J. C., F. Douglis, A. Feldmann, B. Krishnamurthy, Potential benefits of delta encoding and data compression for HTTP, Proc. of the ACM SIGCOMM '97 Conf. on Applications, Technologies, Architectures, and Protocols for Comp. Comm., SIGCOMM 1997, Sep. 14-18, 1997, pp. 181-194, Cannes, France.
Muthitacharoen, A., B. Chen, D. Mazières, A low-bandwidth network file system, Proc. of the 18th ACM Symposium on Operating System Principles, SOSP 2001, Oct. 21-24, 2001, pp. 174-187, Chateau Lake Louise, Banff, Alberta, Canada.
Pang, R., M. Allman, M. Bennett, J. Lee, V. Paxson, B. Tierney, A first look at modern enterprise traffic, Proc. of the 5th Conf. on Internet Measurement 2005, Oct. 19-21, 2005, pp. 15-28, Berkeley, California, USA.
Pucha, H., D. G. Andersen, M. Kaminsky, Exploiting similarity for multi-source downloads using file handprints, Proc. of the 4th Symposium on Networked Systems Design and Implementation, NSDI 2007, Apr. 11-13, 2007, Cambridge, Massachusetts, USA.
Spring, N. T., D. Wetherall, A protocol-independent technique for eliminating redundant network traffic, Proc. of the ACM SIGCOMM 2000 Conf. on Applications, Technologies, Architectures, and Protocols for Comp. Communication, SIGCOMM 2000, Aug. 28-Sep. 1, 2000, pp. 87-95, Stockholm, Sweden.
Tolia, N., M. Kaminsky, D. G. Andersen, S. Patil, An architecture for internet data transfer, Proc. of the 3rd Symposium on Networked Systems Design and Implementation, NSDI 2006, May 8-10, 2006, San Jose, California, USA.
"Non-Final Office Action", From U.S. Appl. No. 12/016,587, Mailed Jul. 15, 2010.
"Response to the Jul. 15, 2010 Non-Final Office Action", From U.S. Appl. No. 12/016,587, filed Jul. 29, 2010.
"Non-Final Office Action", From U.S. Appl. No. 12/016,587, Mailed Oct. 13, 2010.
"Response to the Oct. 13, 2010 Non-Final Office Action", From U.S. Appl. No. 12/016,587, filed Feb. 14, 2010.
Spring et al., "A Protocol-Independent Technique for Eliminating Redundant Network Traffic", Proceedings of the International ACM SIGCOMM 2000 Conference, 2000.
Pucha et al., "Exploiting Similarity for Multi-Source Downloads Using File Handprints", Proceedings of the 4th USENIX Symposium on Networked Systems Design and Implementation, pp. 15-28, Apr. 11-13, 2007.
Calvert et al., "Moving Toward the Middle: The Case Against the End-to-End Argument in Home Networking" Proceedings of the Sixth ACM SIGCOMM Workshop on Hot Topics in Networks (HotNets-VI), Nov. 14-15, 2007.
"International Preliminary Report on Patentability", From PCT Application Number: PCT/US2008/088096 Mailed Jul. 20, 2010.
"Response to Non-Final Office Action for U.S. Appl. No. 12/016,587", Mailed Date: Oct. 13, 2010, Filed Date: Feb. 14, 2011, 12 pages.
"Notice of Allowance for U.S. Appl. No. 12/016,587", Mailed Date: Apr. 7, 2011, 5 pages.
"Notice of Allowance for U.S. Appl. No. 12/016,587", Mailed Date: May 19, 2011, 2 pages.
Tridgell, Andrew, "Efficient Algorithms for Sorting and Synchronization", PhD Thesis, Australian National University, Apr. 2000, 115 pages.
Jain, et al., "Taper: Tiered Approach for Eliminating Redundancy in Replica Synchronization", FAST '05, Fourth USENIX Conference on File and Storage Technologies, 2005, pp. 281-294.
Bjorner, et al., "Content-Dependent Chunking for Differential Compression, the Local Maximum Approach", Microsoft Technical Report TR-2007-102, Aug. 2007, 93 pages.

* cited by examiner

ASYMMETRIC END HOST REDUNDANCY ELIMINATION FOR NETWORKS

BACKGROUND

With the advent of globalization, networked services have a global audience, both in the consumer and enterprise spaces. For example, a large corporation today may have branch offices at dozens of cities around the globe. In such a setting, the corporation's information technology (IT) administrators and network planners face a dilemma. On the one hand, they could centralize or concentrate the servers that power the corporation's IT services (such as e-mail and file servers) at one or a small number of locations. This would keep administration costs low but may drive up network costs and also hurt performance, because what would have normally been local-area network (LAN) traffic becomes wide-area network (WAN) traffic. On the other hand, the servers and services could be distributed to be closer to clients. However, this would likely drive up the complexity and cost of developing and administering the services.

Having both would be ideal, specifically, having the operational benefits of centralization along with the performance benefits of distribution. In recent years, protocol-independent redundancy elimination (RE) has emerged as a powerful technique to help bridge the gap by making WAN communication more efficient through elimination of redundancy in traffic. Such compression is typically applied at the internet protocol (IP) or transmission control protocol (TCP) layer. For example, this compression can use a pair of middleboxes placed at either end of a WAN link connecting a corporation's data center and a branch office. Each box stores the payload from any flow traversing the link between them in a cache, irrespective of the application or protocol. When one box detects chunks of data that match entries in its cache (by computing "fingerprints" of incoming data and matching them against cached data), it encodes the matched data with tokens. The box at the far end reconstructs the original data using its own cache and the encoded tokens. Recently, this approach has seen increasing commercial deployment as part of a suite of optimizations in middleboxes called WAN optimizers. In fact, many enterprises today use WAN optimizers that are deployed across WAN access links to eliminate redundancy in network traffic and reduce WAN access costs.

These middlebox-based solutions, however, have two key drawbacks that impact their overall usefulness in the long term. First, with the standardization of secure transmission protocols, there is a growing shift toward end-to-end encryption of data. Unfortunately, middleboxes do not cope well with traffic encrypted end-to-end and many leave such data uncompressed. A small fraction of middleboxes employ tricks (such as connection termination and sharing of encryption keys) to accommodate secured socket layer (SSL) and secure shell (SSH) traffic, but these weaken end-to-end semantics of enterprise transactions considerably. Second, in-network middleboxes do nothing to improve performance over last-hop links of mobile and wireless devices, and these devices are beginning to overrun the enterprise workplace. If end-to-end encryption does become ubiquitous, and the adoption of resource constrained mobile and wireless devices continues its upward trend, then RE will eventually be forced out of middleboxes and directly into end host stacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the end host redundancy elimination system and method provide redundancy elimination as an end system service. Unlike middleboxes, embodiments of the system and method benefit both end-to-end encrypted traffic as well as traffic on last-hop wireless links to mobile devices. Embodiments of the system and method are fast, adaptive and parsimonious in memory usage in order to opportunistically leverage resources on end hosts.

While client processing and memory are paramount, servers that are used in embodiments of the system and method need to do other things as well (unlike middleboxes). This means that server central processing unit (CPU) and memory are also crucial bottlenecks in the asymmetric design used in embodiments of the system and method. In order to address these bottlenecks, embodiments of the system and method include a load-adaptive fingerprinting technique that is much faster than Rabin fingerprinting that is used in many existing redundancy elimination techniques (while still delivering similar compression). However, unlike the Rabin fingerprinting technique, the load-adaptive fingerprinting technique used in embodiments of the system and method can also adapt its CPU usage depending on server load. Embodiments of the load-adaptive fingerprinting technique are also tunable in that a sampling period can be adjusted to reduce server processing if the server is busy (at the cost of reduced compression gains).

Effective protocol-independent end-host redundancy elimination involves finding small redundant chunks of the order of 32-64 bytes (because most transfers involve just a few packets each). Existing techniques algorithms for such fine-scale redundancy are quite expensive in terms of memory and processing, especially on resource-constrained clients such as smartphones. Embodiments of the end host redundancy elimination system and method use an asymmetric design that systematically offloads from clients to servers as much of processing and memory as possible. Clients do no more than perform basic first-in first-out (FIFO) queue management of a small amount of memory and do simple pointer lookups in a client packet cache maintained on the client to decode compressed data sent by the server.

Embodiments of the end host redundancy elimination system and method include optimization techniques that reduce server memory footprint as compared to existing approaches. For server storage, embodiments of the system and method use a suite of highly-optimized data structures for managing metadata and cached payloads. For example, an optimized asymmetric max-match technique included in embodiments of the end host redundancy elimination system and method require 33% less memory as compared to existing max-match techniques. Moreover, an optimized asymmetric chunk-match technique included in embodiments of the end host redundancy elimination system and method cut down the aggregate memory requirements at the server by up to four times as compared to existing chunk-match techniques, while sacrificing a small amount of redundancy.

Embodiments of the end host redundancy elimination system and method operate above the transmission control protocol (TCP) layer, thereby reducing the number of roundtrips needed for data transfer. Similarly, on mobile smartphones, the low decoding overhead on clients can help translate bandwidth savings into an equivalent amount of energy savings as compared to no compression.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the end host redundancy elimination system and method reference is made to the accompanying drawings, which form a part thereof, and in which is shown by way of illustration a specific example whereby embodiments of the end host redundancy elimination system and method may be practiced. It is to be understood that other embodiments may be utilized and structural changes may be made without departing from the scope of the claimed subject matter.

I. System Overview

Figure 1:
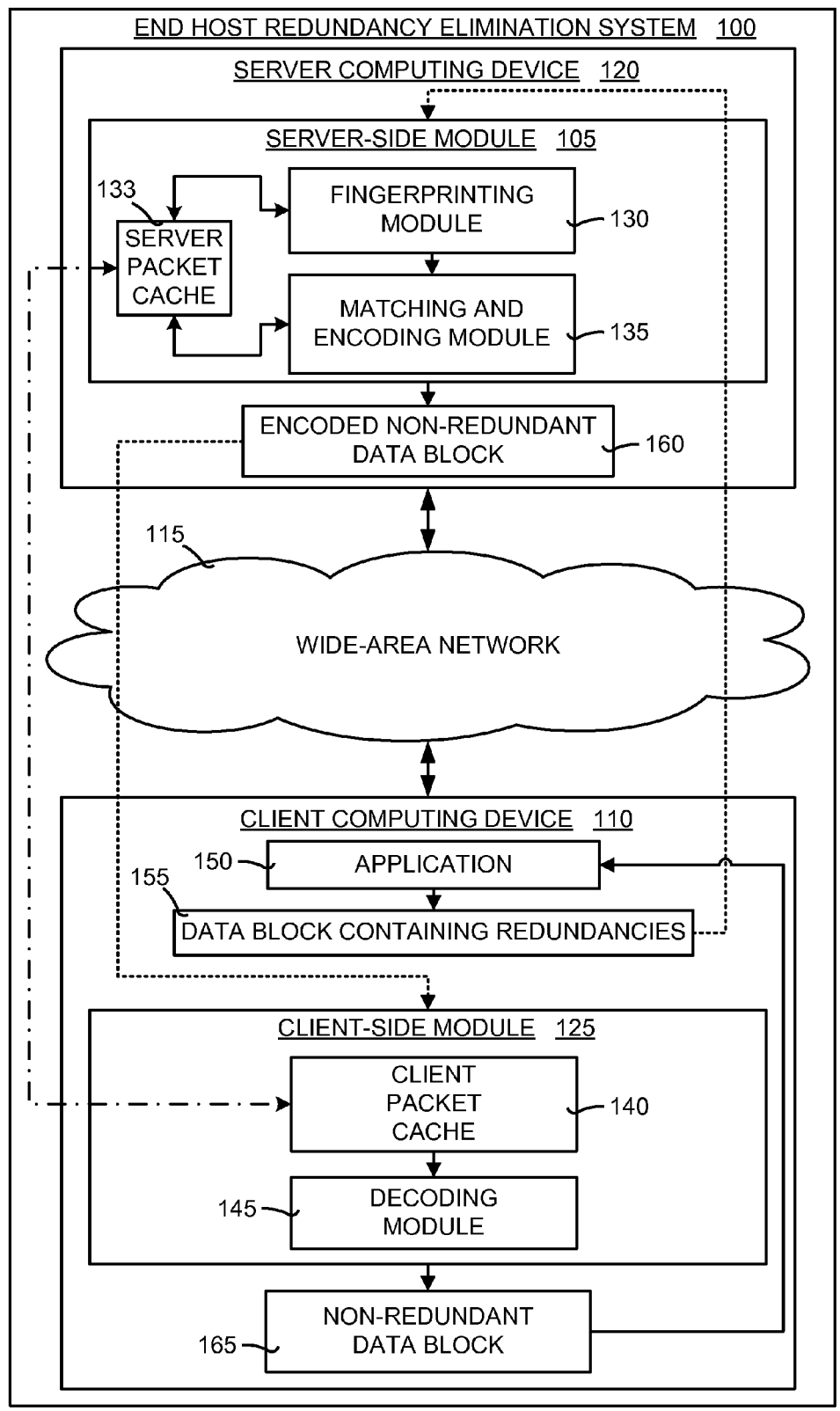
FIG. 1 is a block diagram illustrating a general overview of embodiments of the end host redundancy elimination system and method implemented in a computer network.

FIG. 1 is a block diagram illustrating a general overview of embodiments of the end host redundancy elimination system 100 and method implemented in a computer network. The computer network includes at least one server computing device 120 and at least one client computing device 110 in communication with each other over a wide-area network 115. In general, embodiments of the end host redundancy elimination system 100 and method process a data block from an application and reduce any redundancies. The majority of the processing is performed by the server computing device 120. In addition, the entire redundancy elimination technique contained in embodiments of the system 100 and method are applied before any encryption, such as is used in HTTPS SSL and IPSec.

More specifically, embodiments of the end host redundancy elimination system 100 shown in FIG. 1 include a server-side module 105, which resides on the server computing device 120, and a client-side module 125, which resides on the client computing device 110. The server-side module 105 includes a fingerprinting module 130, a server packet cache 133, and a matching and encoding module 135. The fingerprinting module 130 identifies representative regions of a data block and includes fingerprints and markers. The server packet cache 133 maintains a cache of payload from previous traffic exchanged between the server computing device 105 and the client computing device 110. The matching and encoding module 135 finds and removes any redundant data in the data block and encodes the resultant data.

The client-side module 125 includes a client packet cache 140 and a decoding module 145. The client packet cache 140, which is maintained by the client computing device 110, contains a simple cache of metadata that allows redundant data to be identified. This metadata includes payload from past traffic exchanged between the client computing device 110 and the server computing device 120. The client packet cache 140 and the server packet cache 133 are synchronized with each other. This synchronization is illustrated in FIG. 1 by the dashed and dotted line. The decoding module 145 decodes the encoded data that is sent from the server computing device 120. An application 150 sends a data block containing redundancies 155 over the wide-area network 115 to the server computing device 120. As explained in detail below, the server-side module 105 processes the data block containing redundancies 155 to generate an encoded non-redundant data block 160.

The non-redundant data block 160 is sent by the server computing device 120 over the wide-area network 115 to the client computing device 110. The non-redundant data block 160 is processed and decoded by the client-side module 125 to generate a non-redundant data block 165. This non-redundant data block 165 is used by the application 150.

Figure 2:
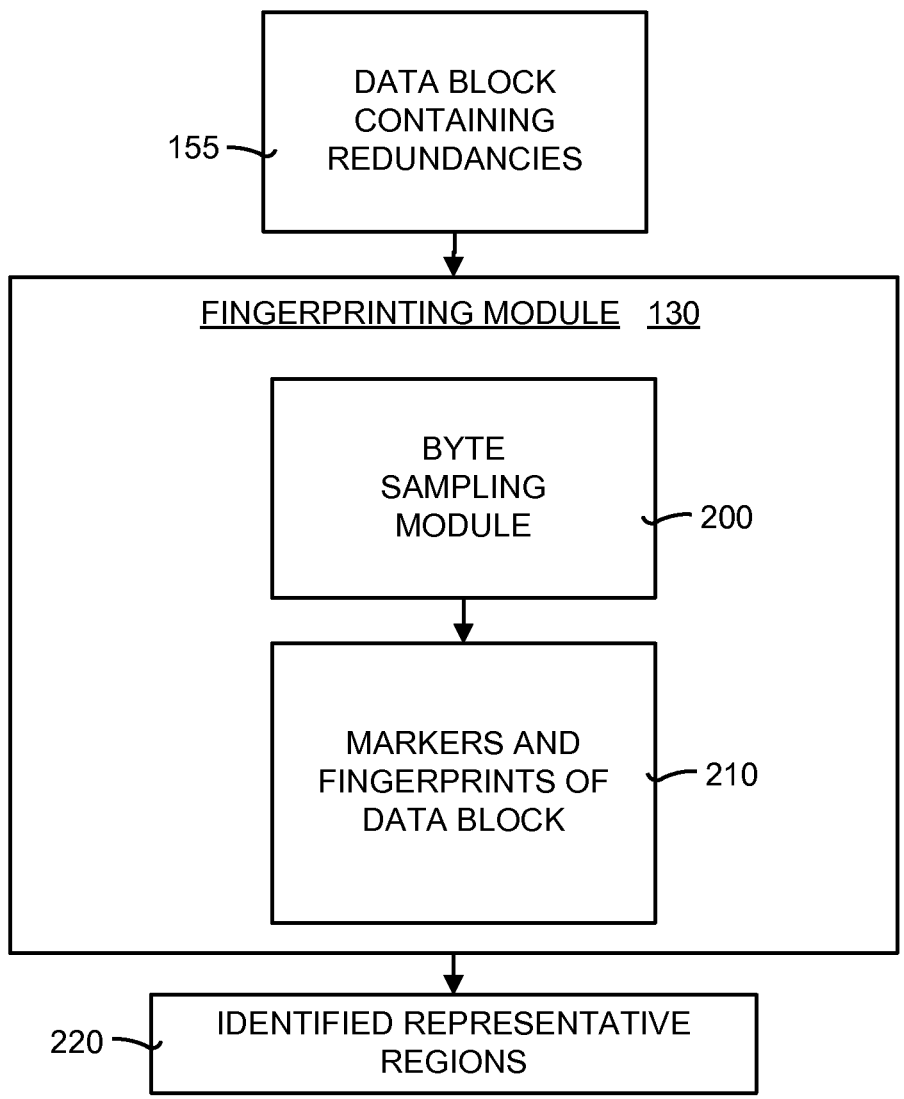
FIG. 2 is a block diagram illustrating the module and data used in embodiments of the fingerprinting module shown in FIG. 1.

FIG. 2 is a block diagram illustrating the module and data used in embodiments of the fingerprinting module 130 shown in FIG. 1. In general, embodiments of the fingerprinting module 130 include a module for generating markers and fingerprints from a collection of data. More specifically, embodiments of the fingerprinting module 130 input the data block containing redundancies 155 for processing. Embodiments of the module 130 include a byte sampling module 200 that samples bytes of data from the data block containing redundancies 155 to obtain markers and fingerprints of the data block 210. From these markers and fingerprints embodiments of the module 130 identify and then output the identified representative regions 220.

Figure 3:
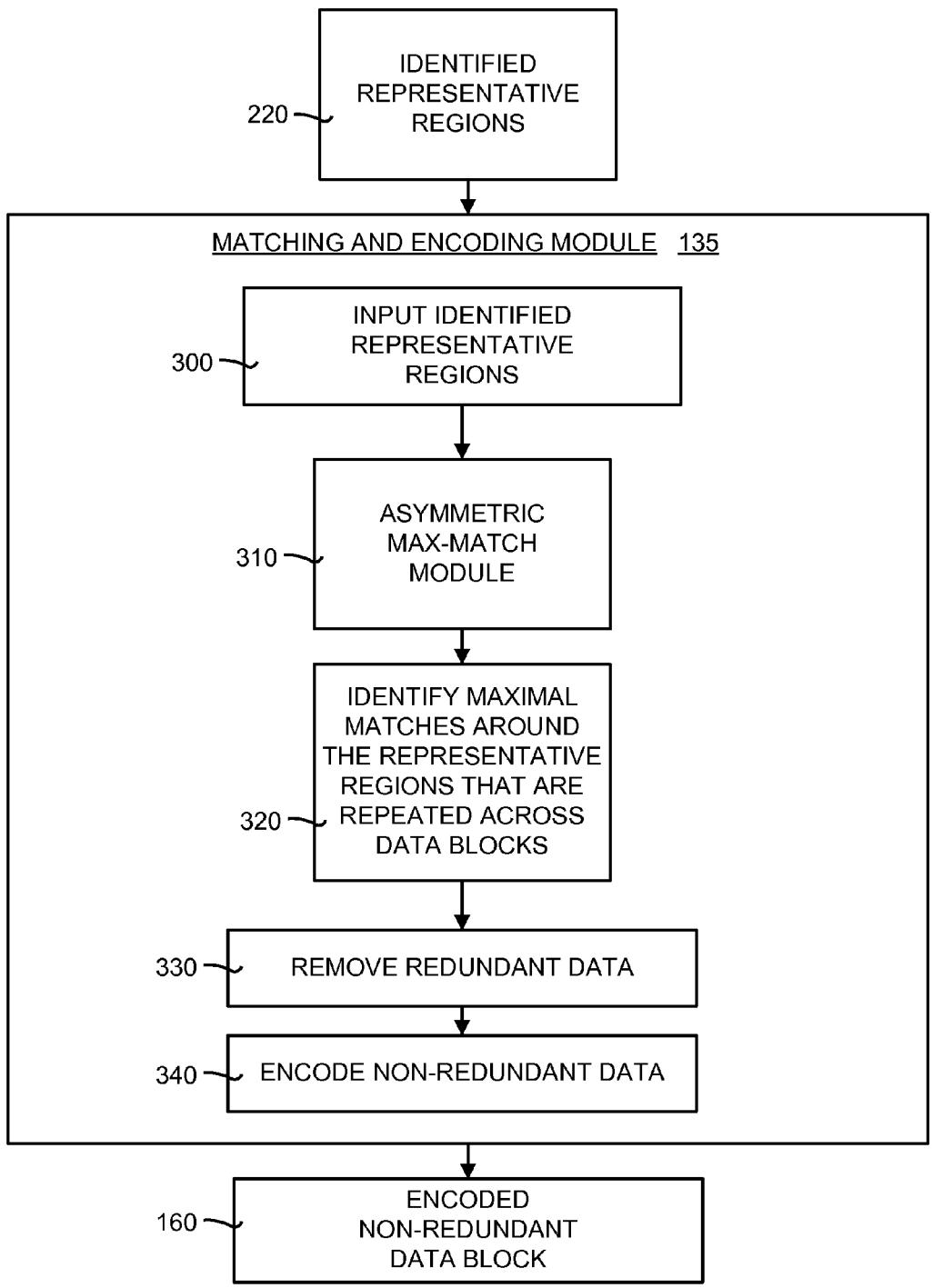
FIG. 3 is a block diagram illustrating modules and data used in embodiments of the matching and encoding module shown in FIG. 1.

FIG. 3 is a block diagram illustrating modules and data used in embodiments of the matching and encoding module 135 shown in FIG. 1. In general, embodiments of the matching and encoding module 135 input the identified representative regions 220 (box 300) and output the encoded non-redundant data block 160. More specifically, embodiments of the matching and encoding module 135 include an asymmetric max-match module 310, which uses an optimized max-match technique.

The identified representative regions 220 are processed by embodiments of the module 310 to identify maximal matches around the representative regions that are repeated across data blocks (box 320). Embodiments of the matching and encoding module 135 then remove any identified redundant data (box 330). Next, the remaining non-redundant data is encoded (box 340). The output from embodiments of the matching and encoding module 135 is the encoded non-redundant data block 160.

II. Operational Overview

Figure 4:
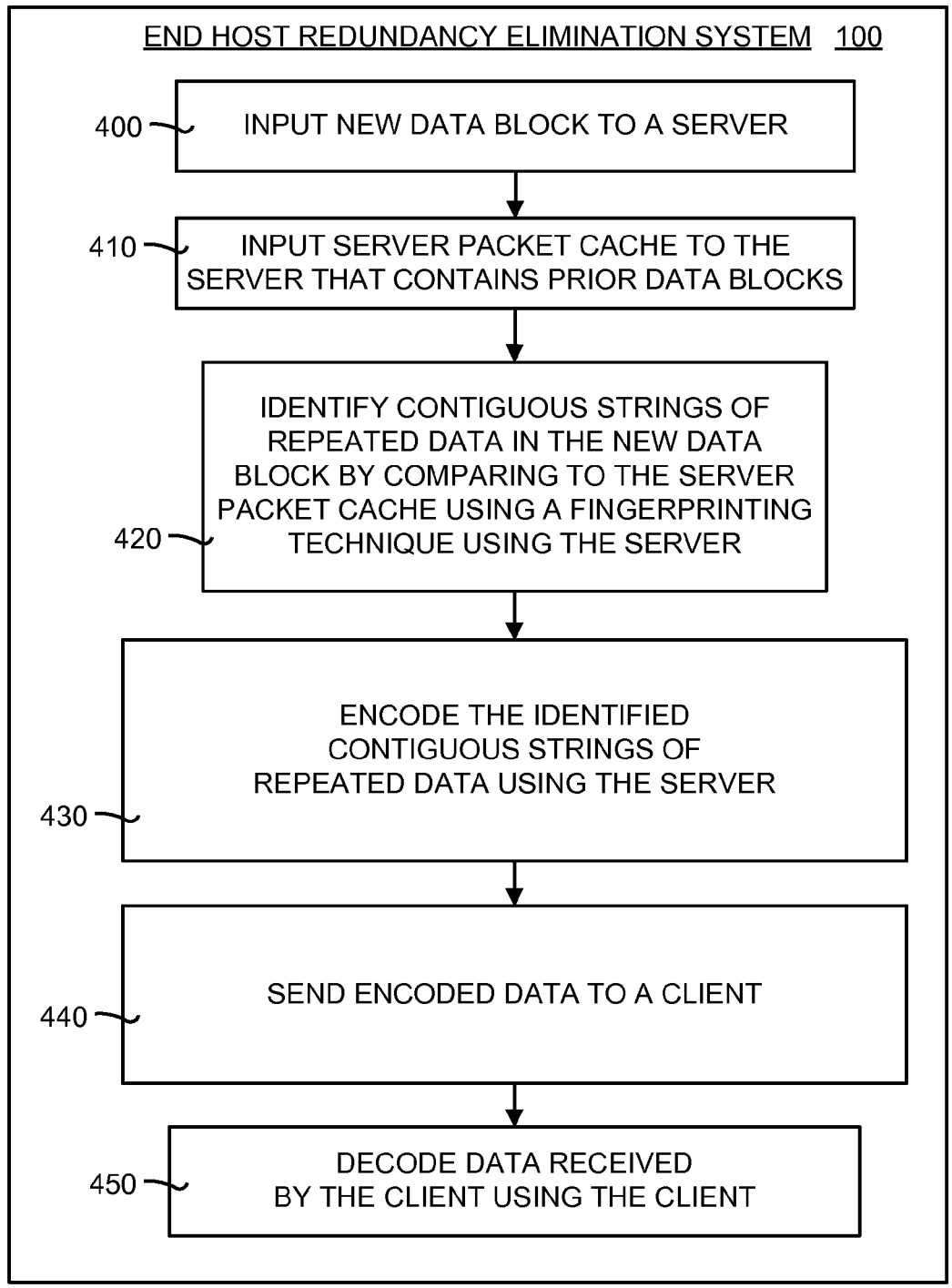
FIG. 4 is a flow diagram illustrating the general operation of embodiments of the end host redundancy elimination system shown in FIGS. 1-3.

FIG. 4 is a flow diagram illustrating the general operation of embodiments of the end host redundancy elimination system 100 shown in FIGS. 1-3. Referring to FIG. 4, the method begins by inputting a new data block to a server (box 400). In addition, a server packet cache 133 is input to the server (box 410). The server packet cache 133 contains previous data blocks that have been exchanged between the server and a client on the computer network.

Next, embodiments of the system 100 identify contiguous strings of repeated (or redundant) content in the new data block (box 420). As explained in detail below, this is achieved by comparing the content to content in the prior data cache using a fingerprinting technique. It should be noted that this comparison and computation is performed by the server.

Embodiments of the system 100 then encode any identified contiguous strings of repeated data (box 430). This encoding, which is performed by the server, produces encoded contiguous strings of repeated data. The encoded data then is sent to a client (box 440). At the client, the encoded data is received and decoded box 450).

III. System and Operational Details

Embodiments of the end host redundancy elimination system 100 and method are designed to optimize data transfers in the direction from servers in a remote data center to clients in the enterprise. This captures a majority of enterprise traffic. Embodiments of the system 100 and method introduce redundancy elimination modules into the network stacks of clients and remote servers. Because it is desirable to be transparent to applications, embodiments of the system 100 and method can be implemented either at the IP layer or at the socket layer (above the transmission control protocol (TCP) layer).

Implementing embodiments of the end host redundancy elimination system 100 and method at either the IP layer or the socket layer offers key performance benefits over an IP layer approach, and shields embodiments of the system 100 from network-level events (such as packet losses and reordering). This increases the ease of installation.

As noted above, there are two sets of modules in embodiments of the end host redundancy elimination system 100 and method: those belonging on servers and those on clients. The server-side module 105 is responsible for identifying redundancy in network data by comparing against a cache of prior data contained in the server packet cache 133, and encoding the redundant data with shorter metadata. In some embodiments this metadata is essentially a set of (offset, length) tuples that are computed with respect to the server packet cache 133.

The client-side module 125 includes the client packet cache 140 and the decoding module 145. In some embodiments the client packet cache 140 and the server packet cache 133 include a fixed-size circular first-in first out (FIFO) log of packets. Moreover, in some embodiments the decoding module 145 is a simple logic to decode the metadata by "dereferencing" the offsets sent by the server.

Thus, the complexity in redundancy elimination is mainly on the server computing device 120. In particular, when a new data block is received by the server-side module 105 which efficiently identifies and encodes contiguous strings of repeated content in the data block with respect to a cache of prior data in the server packet cache 133. Since it is desirable that this process be fast, embodiments of the system 100 and method accomplish this using the following two broad steps.

First, a fingerprinting step is used. This involves selecting a few "representative regions" for the current block of data handed down by the application 150. Second, matching and encoding steps are used. Once the representative regions are identified, one of two approaches may be used for identification of redundant content. As described in detail below, one of these techniques is an asymmetric chunk-match technique that identifies chunks of representative regions that repeat in full across data blocks. As also described in detail below, another technique is an asymmetric max-match technique that identifies maximal matches around the identified representative regions that are repeated across data blocks. These two approaches differ in the trade-off between the memory overhead imposed on the server and the effectiveness of redundancy elimination.

The system and the operational details of embodiments of the end host redundancy elimination system 100 and method now will be discussed. These embodiments include embodiments of the byte sampling module 200 and the asymmetric max-match module 310. The system and operational details of each of these modules now will be discussed in detail.

III.A. Byte Sampling Module

Embodiments of the byte sampling module 200 takes the data block containing redundancies 155 and obtains markers and fingerprints of the data contained therein. Using these markers and fingerprints, embodiments of the module 200 identify representative regions. These identified representative regions are used to reduce the amount of redundant data sent over the wide-area network 115.

III.A.1. Fingerprinting Notation and Terminology

Before discussing the details of the byte sampling module 200, some notation and terminology are introduced to help explain the approach. A "data block" (or simply a "block") is a certain amount of data handed down by the application 150 to embodiments of the system 100 and method at the socket layer. Each data block can range from a few bytes to tens of kilobytes in size.

Mathematically, let $\grave{u}$ represent the size of the minimum redundant string (contiguous bytes) to identify. For a data block of size S bytes, where $S \geq \grave{u}$, a total of $S - \grave{u} + 1$ strings of size $\grave{u}$ are potential candidates for finding a match. Typical values for $\grave{u}$ range from 12 to 64 bytes. In some embodiments a default value of $\grave{u}=32$ bytes is selected in order to maximize effectiveness of redundancy elimination.

Since $S \gg \grave{u}$, the number of such candidate strings is on the order of the number of bytes in the data block or cache. Because it is impractical to match and store all possible candidates, a fraction 1/p "representative" candidates are chosen.

"Markers" are defined as the first byte of these selected candidate strings and chunks as the string of bytes between two markers. In addition, "fingerprints" are defined as a pseudo-random hash of fixed $\grave{u}$-byte strings beginning at each marker and "chunk-hashes" are defined as hashes of variable-sized chunks. Note that while two fingerprints may have overlapping bytes, by definition chunks are disjoint. Existing fingerprinting techniques vary primarily in the manner in which they choose the markers. From the markers, embodiments of the byte sampling module 200 can derive chunks, fingerprints, and chunk-hashes.

III.A.2. Existing Fingerprinting Techniques

Before discussing the details of the byte sampling module 200, it is instructive to discuss in general terms three existing fingerprinting techniques. In some embodiments of the fingerprinting module 130, any one of these three techniques may be used.

III.A.2.i. MODP Fingerprinting Technique

The MODP fingerprinting technique selects a set of fingerprints by first computing a Rabin-Karp hash over sliding windows of $\grave{u}$ contiguous bytes of the data block. A fraction 1/p are chosen whose fingerprint value is 0 mod p. Choosing fingerprints in this manner has the advantage that the set of representative fingerprints for a block remains mostly the same despite small amount of insertions, deletions, and reorderings since the markers and fingerprints are chosen based on content rather than position.

However, it should be noted that the two distinct operations of marker identification and fingerprinting are both handled by the same hash function. While this appears elegant it comes at a cost. Specifically, the per block computational cost is independent of the sampling period, p. Thus, this approach cannot adapt to server CPU load conditions (such as by varying p).

III.A.2.ii. MAXP Fingerprinting Technique

Apart from the conflation of marker identification and fingerprinting, one shortcoming of the MODP fingerprinting technique is that the fingerprints and markers are chosen based on a global property. In other words, fingerprints have to take certain pre-determined values to be chosen. The markers for a given block may be clustered and there may be large intervals without any markers, which can limit redundancy identification opportunities.

In order to guarantee that an adequate number of fingerprints and markers are selected uniformly from each block, the MAXO fingerprinting technique selects markers as those bytes that are the local-maxima over each region of p bytes of the data block. Then, once the marker byte is chosen, an efficient hash function (such as Jenkins Hash) can be used for computing the fingerprint. In addition, by increasing p fewer maxima-based markers need to be identified. This in turn reduces CPU overhead.

III.A.2.iii. FIXED Fingerprinting Technique

Markers in both the MODP and MAXP fingerprinting techniques are selected based on content of the data block and use Rabin hashes and local maxima. However, the computation of Rabin hashes and local maxima can be expensive. The FIXED fingerprinting technique is a simpler approach that is content agnostic.

Specifically, the FIXED fingerprinting technique selects every $p^{th}$ byte as a marker. Marker identification incurs no computational cost, because markers are chosen by position. Once markers are chosen, S/p fingerprints are computed using a Jenkins Hash technique, as is done in the MAXP fingerprinting technique.

III.A.3. Byte Sampling Fingerprinting Technique

The MAXP and MODP fingerprinting techniques are content-based and thus robust to small changes in content, while FIXED is content agnostic but computationally efficient. The byte sampling fingerprinting technique is designed to combine the robustness of a content-based approach with the computational efficiency of the FIXED fingerprinting technique. The byte sampling fingerprinting technique is content-based (albeit based on a single byte) and retains the content-skipping and computational characteristics of the FIXED fingerprinting technique.

Figure 5:
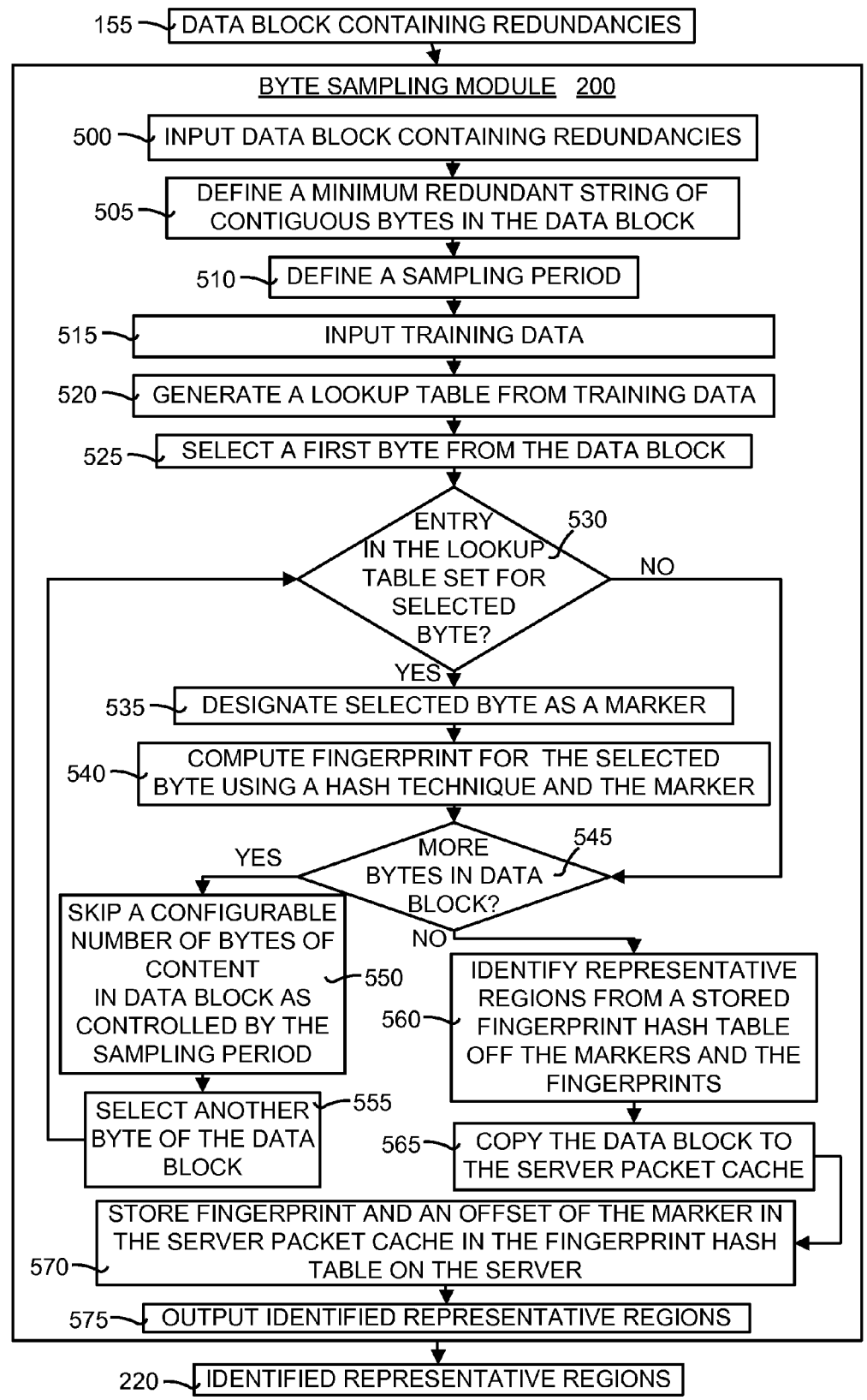
FIG. 5 is a flow diagram illustrating the operational details of embodiments of the byte sampling module shown in FIG. 2.

FIG. 5 is a flow diagram illustrating the operational details of embodiments of the byte sampling module 200 shown in FIG. 2. Embodiments of the module 200 begin by inputting a data block containing redundancies (box 500). In addition, embodiments of the module 200 define a minimum redundant string of contiguous bytes in the data block (box 505). Next, a sampling period for sampling the bytes of the data block is defined (box 510). The sampling period can be determined by the load at the server. If the server has a high application load, then the sampling period can be increased so that redundancy elimination does not affect the application.

Embodiments of the module 200 use a lookup table. The lookup table is generated by first inputting training data (box 515) and then generating the lookup table from the training data (box 520). In some embodiments, the lookup table is a 256-entry lookup table with a few predefined positions set.

Once the lookup table has been generated, embodiments of the module 200 select one byte at a time from the data block to analyze. As shown in FIG. 5, a first byte is selected from the data block obtain a selected byte (box 525). A determination then is made as to whether there is an entry corresponding to the selected byte in the lookup table that is set (box 530). As the data block is scanned byte-by-byte, a byte is designated as a marker if the corresponding entry in the lookup table is set (box 535).

Once a marker is selected a fingerprint is computed for the selected byte using a hashing technique and the marker (box 540). In some embodiments this hashing technique is performed by hashing a contiguous windows of bytes of the new data block that begins at the marker. Another determination is made as to whether there are more bytes in the data block (box 545). If so, then a configurable number of bytes of content in the data block are skipped as controlled by the sampling period (box 550). In other words, the configurable number of bytes of content is controlled by the sampling period. In some embodiments, the configurable number of bytes of content is determined as half of the sampling period (p/2). After the specified number of bytes of content is skipped, another byte of the data block is selected at this point (box 555) and the process repeats with determining whether an entry corresponding to a selected byte in the lookup table is set for the selected byte (box 530). If there are no more bytes in the data block, then embodiments of the module 200 identify representative regions from a stored fingerprint hash table of the markers and the fingerprint (box 560). The data block then is copied to the server packet cache (box 565). The fingerprint and an offset of the marker are stored in the server packet cache in the fingerprint hash table on the server (box 570. The fingerprint hash table is generated and maintained on the server computing device 120 and contains fingerprints and marker offsets from previous data blocks in the server packet cache 133. Finally, the identified representative regions 220 then are output (box 575).

One point of interest is whether embodiments of the byte sampling module 200 will either over-sample or under-sample. First, note that the MODP technique with 32-64 byte rolling hashes was originally used in file systems where chunk sizes were large (on the order of 2-4 kilobytes). Given that sampling may occur as frequently as every 32-64 bytes, sampling chunk boundaries based on 1-byte content values is not as radical as it might first seem. Also, note that if the x entries of the 256-entry lookup table are randomly set (where 256/x=p), then the expected sampling frequency is indeed 1/p.

In addition, embodiments of the byte sampling module 200 skip the configurable number of bytes of content after each marker selection to avoid oversampling when the content bytes of data block are not uniformly distributed (such as when the same content byte is repeated contiguously). In some embodiments this configurable number of bytes of content is equal to half of the sampling period (p/2), While a purely random selection of 256/x entries does indeed perform well, a lookup table is used that is derived based on the heuristic described below. This approach has been found to outperform the random approach and has been effective after extensive testing on traces.

Since the number of unique lookup tables is large ($2^{256}$), embodiments of the byte sampling module 200 use an offline, greedy approach to generate this table. In some embodiments, training data is obtained and then the MAXP technique is run to identify redundant content. Next, the characters are sorted by decreasing order of their presence in the identified redundant content. Embodiments of the byte sampling module 200 then add these characters one at a time and set the corresponding entries in the lookup table to 1. This process is stopped when see diminishing gains in compression are identified.

The intuition behind this approach is that it is desirable to increase the probability of being selected as markers to those characters that are more likely to be part of redundant content. In some embodiments the characters selected in this process from the training data are 0, 32, 48, 101, 105, 115, 116, 255. Because embodiments of the byte sampling module 200 skip i/2 bytes after every marker selection, the fraction of markers chosen is upper-bounded by 2/p irrespective of the number of entries set in the table. By increasing p, fewer markers and fingerprints are chosen, which results in a reduced computational overhead.

III.B. Matching and Encoding Module

Once the markers and fingerprints are identified by embodiments of the fingerprinting module 130, then the matching and encoding module 135 identifies redundant content. This is accomplished using an asymmetric max-match technique contained in embodiments of the asymmetric chunk-match module 310, which identifies maximal matches around fingerprints that are repeated across data blocks.

The asymmetric max-match technique used by embodiments of the matching and encoding module 135 contains several features that improve overhead. A first feature leverages the asymmetry between servers and clients. This asymmetry involves the fact that clients seem to offload most of the computationally intensive operations (such as hash computations) and memory management tasks to the server. A second feature is to exploit the inherent structure within the data maintained at the servers and clients to optimize memory usage.

III.B.1. Asymmetric Max-Match Module

Figure 6:
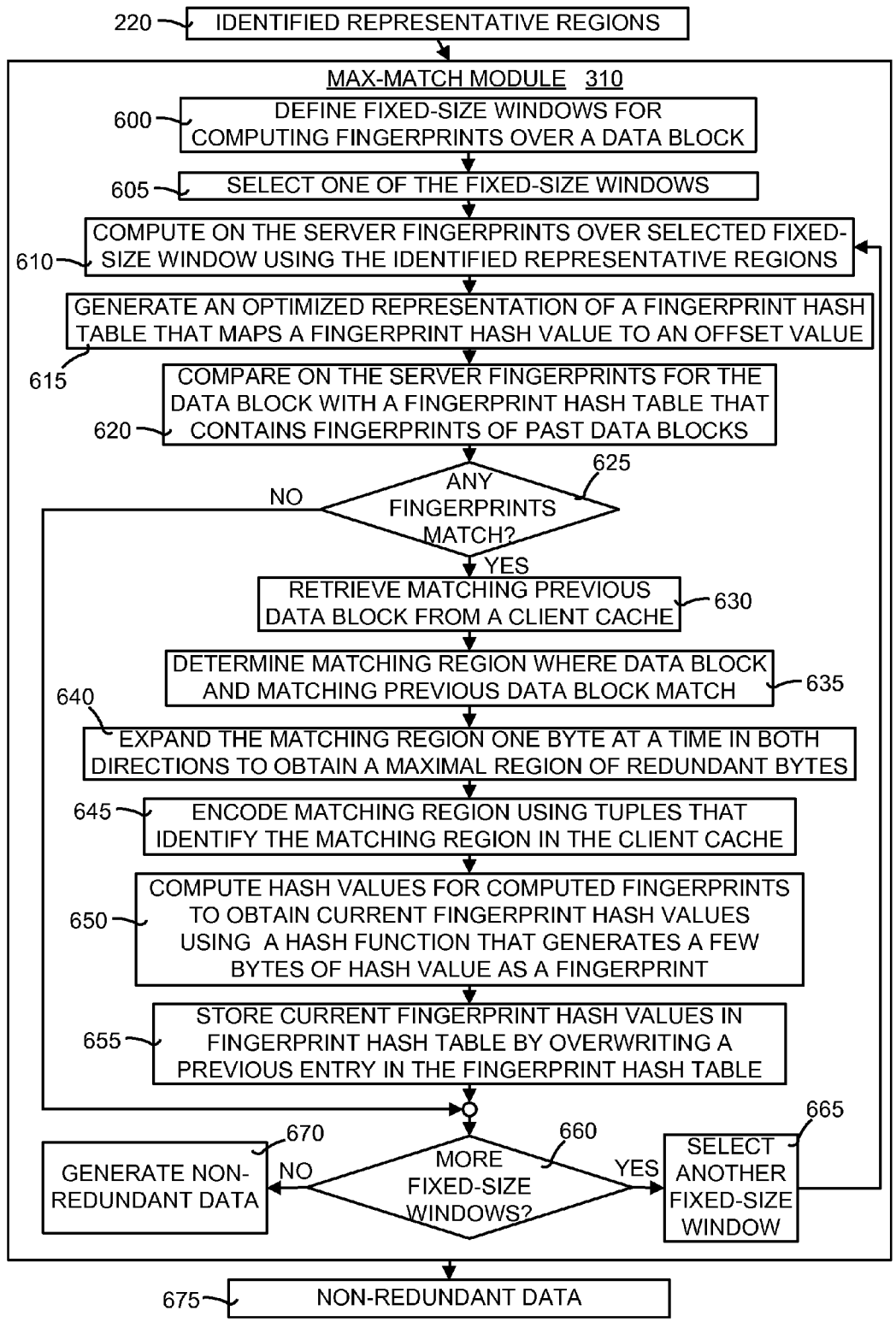
FIG. 6 is a flow diagram illustrating the operational details of embodiments of the asymmetric max-match module shown in FIG. 3.

The matching and encoding module 135 includes an asymmetric max-match module 310. FIG. 6 is a flow diagram illustrating the operational details of embodiments of the asymmetric max-match module 310 shown in FIG. 3. In general, embodiments of the asymmetric max-match module 310 compute fingerprints for a data block. These fingerprints serve as random "hooks" into the data block payload around which more redundancies can be identified.

Specifically, embodiments of the asymmetric max-match module 310 input the identified representative regions 220 and define fixed-size windows for computing fingerprints over a data block (box 600). Next, one of the fixed-size windows is selected (box 605). Fingerprints are computed on the server over the selected fixed-size window using the identified representative regions (box 610).

Embodiments of the module 310 then generate an optimized representation of a fingerprint hash table that maps a fingerprint has value to an offset value (box 615). The computed fingerprints for a data block then are compared with a "fingerprint store" (or fingerprint hash table) that holds fingerprints of all the past data blocks (box 620). A determination then is made as to whether any of the computed fingerprints match (box 625). For each fingerprint of the data block that is matched against the fingerprint hash table, a matching previous data block is retrieved from the server packet cache 133 (box 630).

A matching region then is determined (box 635). This matching region is where the current data block and the previous data block match. Next, the matching region is expanded one byte at a time (or byte-by-byte) in both directions to obtain a maximal region of redundant bytes (box 640). Matched regions then are encoded with tuples that identify the matching region in the server packet cache 133 (box 645). In some embodiments the tuples is an (offset, length) tuples.

Embodiments of the module 310 then compute hash values for the computed fingerprints to obtain current fingerprint hash values (box 650). This is performed using a hash function that generates a few bytes of hash value as a fingerprint. The current fingerprint hash values then are stored in the fingerprint hash table by overwriting a previous entry in the table with the current fingerprint and a marker offset value (box 655). In addition, embodiments of the module 310 avoid explicitly deleting any stale fingerprints and marker offset values in the fingerprint hash table.

Another determination then is made as to whether there are more fixed-size windows (box 660). If so, then another fixed-size window is selected (box 665) and the process repeats by computing on the server fingerprints over the selected fixed-size window using the identified representative regions 220 (box 610). If not, then, embodiments of the module 310 generate the non-redundant data (box 670) and output the non-redundant data 675.

Embodiments of the asymmetric max-match module 310 employ two techniques to improve the server computation and storage overhead. These two techniques will now be discussed.

III.B.1.i. Overwriting Technique

The asymmetric max-match module 310 includes an overwriting technique. This technique overwrites fingerprint value to reduce bookkeeping. In particular, since embodiments of the asymmetric max-match module 310 rely on a byte-by-byte comparison between the bytes in the data block and those in the server packet cache 133, fingerprint collisions are not costly. In other words, any collisions will be recovered by using an extra memory lookup. This allows embodiments of the module 310 to significantly limit fingerprint store maintenance overhead for fingerprint techniques since fingerprint values are simply overwritten without separate bookkeeping for deletion. Moreover, a relatively simple hash function that generates a few bytes of hash value as a fingerprint is sufficient. In some embodiments this hash function is a Jenkins Hash function.

III.B.1.ii. Optimized Representation Technique

The asymmetric max-match module 310 also includes an optimized representation technique. This technique uses an optimized representation of the fingerprint hash table that reduces storage needs significantly. Since the mapping is from a fingerprint (hash value) to an offset value, the fingerprint itself need not be stored in the table in its entirety.

Embodiments of the module 310 use an index of the fingerprint hash table to implicitly represent all or part of the fingerprint. Only remaining bits of the fingerprint, if there are any, which are not covered by the index can be stored in the hash table. In an extreme case when the index represents all of the fingerprint, the fingerprint hash table is simply an offset table. The offset table is a contiguous set of offset values indexed by the fingerprint hash value.

Recall from the discussion above that the client packet cache 140 and the server packet cache are synchronized with each other. In some embodiments of the system 100 and method the synchronized cache size of both the client packet cache 140 and the server packet cache 133 is adaptively tuned based on the available memory at the server. Thus, the lower the server memory the lower the synchronized cache size and the memory that is used for the client packet cache 140 and the server packet cache 133.

By way of example, assume a fingerprint store for a synchronized cache size of 16 MB and a sampling period, p, of 64. In this case, the number of fingerprints to index the entire cache is $2^{24}/64$ or $2^{18}$. Using a table size of $2^{18}$ implies that 18 bits of the fingerprint is implicitly stored as the index of the table. The offset size needed to represent the entire cache is 24 bits.

Continuing the example, if it is assumed that an additional 8 bits of the fingerprint is stored as part of the table, the entire fingerprint table can be compactly stored in a table of size $2^{18}*4$ bytes, or 6% of the cache size. A sampling period of 32 would double this to 12% of the cache size. This representation is a significant reduction in fingerprint metadata size compared to prior techniques.

IV. Exemplary Operating Environment

Embodiments of the end host redundancy elimination system 100 and method are designed to operate in a computing environment. The following discussion is intended to provide a brief, general description of a suitable computing environment in which embodiments of the end host redundancy elimination system 100 and method may be implemented.

Figure 7:
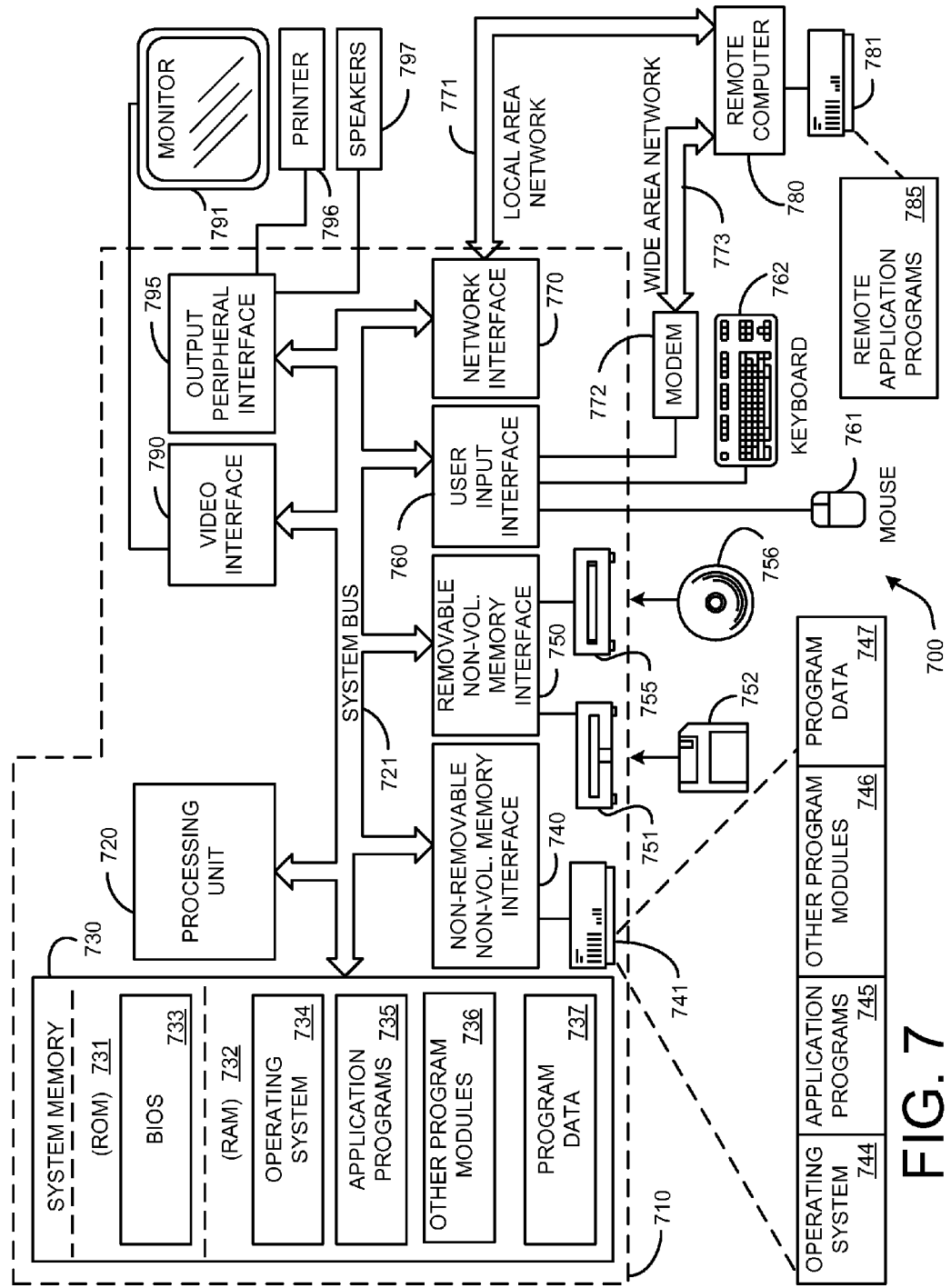
FIG. 7 illustrates an example of a suitable computing system environment in which embodiments of the end host redundancy elimination system and method shown in FIGS. 1-6 may be implemented.

FIG. 7 illustrates an example of a suitable computing system environment in which embodiments of the end host redundancy elimination system 100 and method shown in FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment.

Embodiments of the end host redundancy elimination system 100 and method are operational with numerous other general purpose or special purpose computing system environments or configurations. Examples of well known computing systems, environments, and/or configurations that may be suitable for use with embodiments of the end host redundancy elimination system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the end host redundancy elimination system 100 and method may be described in the general context of computer-executable instructions, such as program modules, being executed by a computer. Generally, program modules include routines, programs, objects, components, data structures, etc., that perform particular tasks or implement particular abstract data types. Embodiments of the end host redundancy elimination system 100 and method may also be practiced in distributed computing environments where tasks are performed by remote processing devices that are linked through a communications network. In a distributed computing environment, program modules may be located in both local and remote computer storage media including memory storage devices. With reference to FIG. 7, an exemplary system for embodiments of the end host redundancy elimination system 100 and method includes a general-purpose computing device in the form of a computer 710.

Components of the computer 710 may include, but are not limited to, a processing unit 720 (such as a central processing unit, CPU), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer readable media. Computer readable media can be any available media that can be accessed by the computer 710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within the computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information (or data) into the computer 710 through input devices such as a keyboard 762, pointing device 761, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 720 through a user input interface 760 that is coupled to the system bus 721, but may be connected by other interface and bus structures, such as, for example, a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method, comprising:
receiving, on a socket layer from an application, a new data block at a server on a computer network configured to support communication between the server and a client;
accessing a server packet cache, the server packet cache containing data blocks that have been previously sent over the computer network between the server and the client on the computer network;
comparing the new data block to individual data blocks in the server packet cache to identify contiguous strings of repeated data in the new data block;
encoding the identified contiguous strings of repeated data as pointer lookups to the server packet cache to reduce redundant data transmission over the computer network; and,
communicating with the client to adaptively tune a synchronized cache size of a client packet cache resident on the client and the server packet cache resident on the server based upon memory available at the server.

2. The method of claim 1, further comprising:
transmitting an individual data block that includes the encoded identified contiguous strings of repeated data over the computer network to the client.

3. The method of claim 2, further comprising:
generating a lookup table, from training data;
selecting one byte at a time from the new data block; and
determining whether an entry corresponding to the selected byte in the lookup table is set.

4. The method of claim 3, further comprising:
in an instance where the entry is set, then designating the selected byte as a marker;
computing a fingerprint for the selected byte by hashing a contiguous window of bytes of the new data block that begins at the marker;
identifying representative regions from a stored fingerprint hash table of markers and the fingerprint;
copying the new data block to the server packet cache; and
storing the fingerprint and an offset of the marker in the server packet cache in the fingerprint hash table on the server.

5. The method of claim 4, further comprising using an index of the fingerprint hash table to implicitly represent at least some part of the fingerprint.

6. The method of claim 4, further comprising:
defining a sampling period;
determining that there are more bytes in the new data block;
defining a configurable number of bytes of content, where the configurable number is controlled by the sampling period;
skipping the configurable number of bytes of content in the new data block; and
selecting another byte of the new data block based on the skipping.

7. The method of claim 6, further comprising:
determining the sampling period based on a load at the server such that in an instance where the server has a high application load then the sampling period is increased so that redundancy elimination does not affect the application.

8. The method of claim 6, further comprising setting the configurable number of bytes of content equal to the sampling period divided by two.

9. The method of claim 8, further comprising maintaining the server packet cache and the client packet cache as a fixed-size circular first-in first-out (FIFO) log of data blocks.

10. The method of claim 1, further comprising:
obtaining representative regions using a fingerprinting technique; and
identifying maximal matches around the representative regions that are repeated across multiple data blocks.

11. The method of claim 10, further comprising:
computing a fingerprint from the representative regions;
generating and maintaining a fingerprint hash table that contains fingerprints and marker offsets from previous data blocks in the server cache;
overwriting a previous entry in the fingerprint hash table with a current fingerprint and marker offset value; and
avoiding explicitly deleting stale fingerprints and marker offset values.

12. A method, comprising:
receiving on an IP layer or a socket layer from an application, a data block containing redundancies;
defining a minimum redundant string of contiguous bytes in the data block that will define redundant data, wherein the minimum redundant string is in a range from 12 bytes to 64 bytes;
processing the data block in a byte-by-byte manner to determine a location of the redundancies using the minimum redundant string of contiguous bytes;
identifying contiguous strings of redundant data in the data block by using a fingerprinting technique and a server packet cache to compare the data block and data from previous data blocks transmitted over a computer network from a server to a client;
communicating with the client to adaptively tune a synchronized cache size of a client packet cache and the server packet cache based upon memory available at the server;
encoding the identified contiguous strings of redundant data to reduce data redundancies; and
sending the encoded data to the client on the computer network.

13. The method of claim 12, further comprising:
inputting training data to the server;
generating a lookup table from the training data;
selecting one byte at a time from the data block to obtain a selected byte; and
determining whether an entry corresponding to the selected byte in the lookup table is set for the selected byte.

14. The method of claim 13, further comprising:
in an instance where the selected byte is set, then designating the selected byte as a marker;
computing on the server a fingerprint for the selected byte using a hash technique;
skipping a sampling period divided by two bytes of content and then selecting another byte of the data block for processing; and
using the server to identify representative regions from the markers and fingerprints.

15. The method of claim 12, further comprising:
obtaining the previous data blocks from one of a client packet cache and a server packet cache, where the previous data blocks are payload from past traffic exchanged between the client and the server and the client packet cache and the server packet cache are synchronized with each other;
defining the synchronized cache size of both the client packet cache and the server packet cache; and
adaptively tuning the synchronized cache size based on available memory at the server such that lower server memory corresponds to a lower synchronized cache size.

16. The method of claim 12, further comprising providing data redundancy elimination as an end system service in a computer network prior to any encryption being used on the data.

17. A method, comprising:
receiving a data block containing redundancies;
accessing a lookup table;
determining that a selected byte from the data block has an entry in the lookup table that is set for the selected byte;
designating the selected byte as a marker;
computing a first fingerprint for the selected byte using a hash technique;
storing the first fingerprint and an offset of the marker in a server packet cache in a fingerprint hash table;
skipping an amount of data equal to a half of a sampling period bytes and processing a byte at that location in the data block;
identifying representative regions from stored marker offsets and stored fingerprints in the fingerprint hash table;
identifying maximal matches around the identified representative regions that are repeated across multiple data blocks; and,
encoding the maximal matches to obtain encoded redundant data.

18. The method of claim 17, further comprising:
defining fixed-size windows for computing second fingerprints over the data block;
selecting one of the fixed-size windows;
using the server to compute the second fingerprints over the selected fixed-size window using the identified representative regions;
generating an optimized representation of the fingerprint hash table that maps a fingerprint hash value to an offset value; and
comparing individual fingerprints for the data block with the fingerprint hash table that contains other individual fingerprints of previous data blocks.

19. The method of claim 18, further comprising:
retrieving fingerprint matches of the previous data blocks from a client packet cache;
determining a matching region where data from the data block and the previous data blocks match; and
expanding the matching region one byte at a time in both directions to obtain a maximal region of redundant bytes.

20. The method of claim 19, further comprising:
encoding the matching region using tuples that identify the matching region in the client packet cache;
computing hash values for the computed second fingerprints to obtain current fingerprint hash values using a hash function that generates a few bytes of hash value as one of the individual fingerprints; and
storing the current fingerprint hash values in the fingerprint hash table by overwriting a previous entry in the fingerprint hash table.

* * * * *